United States Patent
Balaban et al.

(10) Patent No.: US 10,443,649 B2
(45) Date of Patent: Oct. 15, 2019

(54) FLEXURAL PIVOT

(71) Applicant: Raytheon Company, Waltham, MA (US)

(72) Inventors: Scott Balaban, Los Angeles, CA (US); Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 261 days.

(21) Appl. No.: 15/414,201

(22) Filed: Jan. 24, 2017

(65) Prior Publication Data
US 2018/0209475 A1 Jul. 26, 2018

(51) Int. Cl.
*F16C 11/12* (2006.01)
*B23H 9/00* (2006.01)
*F16D 3/00* (2006.01)

(52) U.S. Cl.
CPC .............. *F16C 11/12* (2013.01); *B23H 9/005* (2013.01); *F16D 3/005* (2013.01)

(58) Field of Classification Search
CPC ......... F16C 11/04; F16C 11/045; F16C 11/12; F16D 3/005; B23H 9/005
USPC ... 403/291, 220, 221, 53, 57, 111, 112, 113, 403/119, 121
See application file for complete search history.

(56) References Cited

U.S. PATENT DOCUMENTS

| | | | | |
|---|---|---|---|---|
| 2,793,028 A | * | 5/1957 | Wheeler | F16C 11/12 16/227 |
| 3,252,696 A | * | 5/1966 | Friedel | E05D 1/06 267/160 |
| 3,813,089 A | | 5/1974 | Troeger | |
| 3,844,022 A | * | 10/1974 | Kutash | F16C 11/12 29/416 |
| 4,497,465 A | * | 2/1985 | Yeakley | G02B 7/1821 248/466 |
| 4,592,242 A | * | 6/1986 | Kempas | G01C 19/22 403/119 |

(Continued)

FOREIGN PATENT DOCUMENTS

| | | | |
|---|---|---|---|
| DE | 10 2014 00218 A1 | 8/2015 | |
| EP | 0840023 A1 | 5/1998 | |
| GB | 1427170 A * | 3/1976 | .............. F16C 11/12 |

OTHER PUBLICATIONS

International Search Report for International Application No. PCT/US2017/062884 dated Jan. 31, 2018, 14 pages.

*Primary Examiner* — Jonathan P Masinick

(57) ABSTRACT

A flexural pivot is disclosed. The flexural pivot can include a first flexure support member, a second flexure support member rotatably coupled to the first flexure support member for relative rotation about a first axis, and a third flexure support member rotatably coupled to the second flexure support member for relative rotation about a second axis. In addition the flexural pivot can include a plurality of cross blade flexures rotatably coupling the flexure support members to one another. Each cross blade flexure can have first and second flexible blade units that have flexible blades arranged in a cross configuration. The flexible blade units can have blade supports disposed at opposite ends of the flexible blades to facilitate coupling the flexible blade units to the flexure support members. The flexible blade and the blade supports of each flexible blade unit can form a monolithic structure.

21 Claims, 4 Drawing Sheets

(56) References Cited

U.S. PATENT DOCUMENTS

| | | | | |
|---|---|---|---|---|
| 4,692,050 A * | 9/1987 | Kaufman | ............... | F16C 11/12 |
| | | | | 248/164 |
| 4,694,703 A * | 9/1987 | Routson | ............... | G01C 19/22 |
| | | | | 403/291 |
| 4,802,784 A | 2/1989 | Brooks | | |
| 4,812,072 A * | 3/1989 | Brooks | .................. | F16C 11/12 |
| | | | | 403/24 |
| 4,997,123 A | 3/1991 | Backus et al. | | |
| 5,061,107 A * | 10/1991 | Brooks | .................. | F16C 11/12 |
| | | | | 403/24 |
| 5,265,853 A * | 11/1993 | Szirtes | .................. | B64G 1/641 |
| | | | | 16/227 |
| 5,335,418 A * | 8/1994 | Krivec | ...................... | B25B 7/06 |
| | | | | 228/189 |
| 5,498,095 A * | 3/1996 | Krivec | ...................... | B25B 7/06 |
| | | | | 30/261 |
| 5,620,169 A * | 4/1997 | Payne | .................... | F16C 11/12 |
| | | | | 248/609 |
| 6,146,044 A | 11/2000 | Calvet | | |
| 6,479,782 B1 * | 11/2002 | Blackburn | ............... | B23H 9/00 |
| | | | | 219/69.17 |
| 6,666,612 B2 * | 12/2003 | Lorigny | ................. | F16C 11/12 |
| | | | | 267/160 |
| 6,896,384 B2 * | 5/2005 | McWhirter | ............ | A61F 9/008 |
| | | | | 359/198.1 |
| 8,708,593 B2 * | 4/2014 | Stratton | ................. | B23P 11/00 |
| | | | | 403/119 |
| 2008/0216286 A1 | 9/2008 | Bertele et al. | | |
| 2013/0308997 A1 | 11/2013 | Smith | | |
| 2014/0023428 A1 * | 1/2014 | Kappel | ............. | A61B 1/00128 |
| | | | | 403/53 |

* cited by examiner

FLEXURAL PIVOT

BACKGROUND

Flexural pivots are devices that permit mechanical members to pivot about a common axis relative to each other through a limited angle range. Because angular motion is accomplished through flexing of elastic flexural elements, rather than contact surface displacement, flexural pivots operate without friction and thus without a need for lubrication. Flexural pivots can therefore be a substitute for bearings in applications where friction and/or the need for lubrication are concerns.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
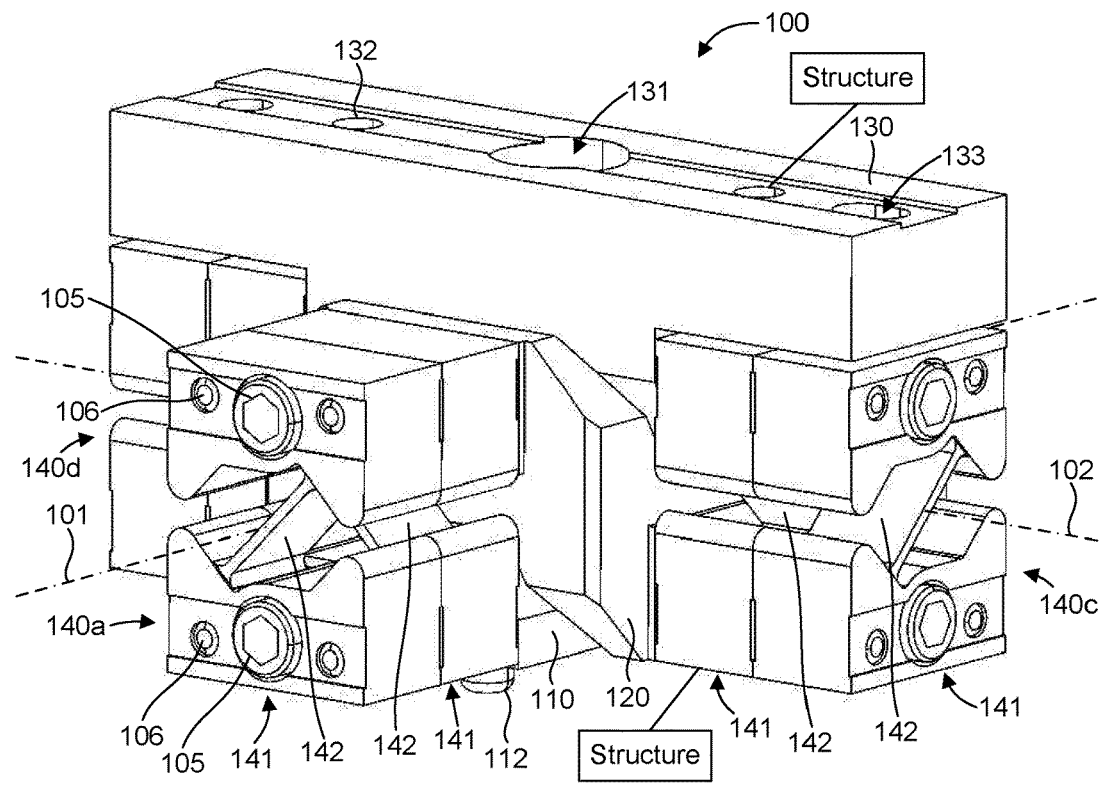
FIG. 1A is a top perspective view of a flexural pivot in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

A variety of flexural pivots are commercially available for a variety of applications. Common problems with typical commercial off-the-shelf (COTS) flexural pivots are repeatable performance and reliability, particularly where high performance and durability are required for the application. This may be due to the difficulty in manufacturing flexural pivots in a commercially viable manner. Thus, it is desirable to develop a flexural pivot design that provides high performance and reliability while being relatively simple and cost-effective to produce.

Accordingly, a flexural pivot is disclosed that can provide high performance and reliability and that is readily able to be manufactured. The flexural pivot can include a first flexure support member, a second flexure support member rotatably coupled to the first flexure support member for relative rotation about a first axis, and a third flexure support member rotatably coupled to the second flexure support member for relative rotation about a second axis. In addition, the flexural pivot can include a plurality of cross blade flexures rotatably coupling the flexure support members to one another. Each cross blade flexure can have first and second flexible blade units that have flexible blades arranged in a cross configuration. The flexible blade units can have blade supports disposed at opposite ends of the flexible blades to facilitate coupling the flexible blade units to the flexure support members. The flexible blade and the blade supports of each flexible blade unit can form a monolithic structure.

A flexural pivot system is also disclosed. The system can comprise a flexural pivot including a first flexure support member, a second flexure support member rotatably coupled to the first flexure support member for relative rotation about a first axis, and a third flexure support member rotatably coupled to the second flexure support member for relative rotation about a second axis. The flexural pivot can also include a plurality of cross blade flexures rotatably coupling the flexure support members to one another. Each cross blade flexure can have first and second flexible blade units that have flexible blades arranged in a cross configuration, the flexible blade units having blade supports disposed at opposite ends of the flexible blades to facilitate coupling the flexible blade units to the flexure support members. The flexible blade and the blade supports of each flexible blade unit can form a monolithic structure. The system can also include a first structure coupled to the first flexure support member, and a second structure coupled to the third flexure support member to facilitate relative rotation of the first and second structures about the first and second axes.

In addition, a method for making a cross blade flexure is disclosed. The method can comprise obtaining a workpiece having a length. The method can also comprise forming a profile in the workpiece of a flexible blade and blade supports disposed at opposite ends of the flexible blade such that the profile extends along the length. The method can further comprise dividing the workpiece into portions along the length to form a plurality of flexible blade units, each having the same profile of flexible blades and blade supports in a monolithic structure. Additionally, the method can comprise pairing two of the flexible blade units such that the flexible blades are arranged in a cross configuration to form a cross blade flexure. It is noted that no specific order is required in this method, though generally in one embodiment, these method steps can be carried out sequentially.

Figure 1B:
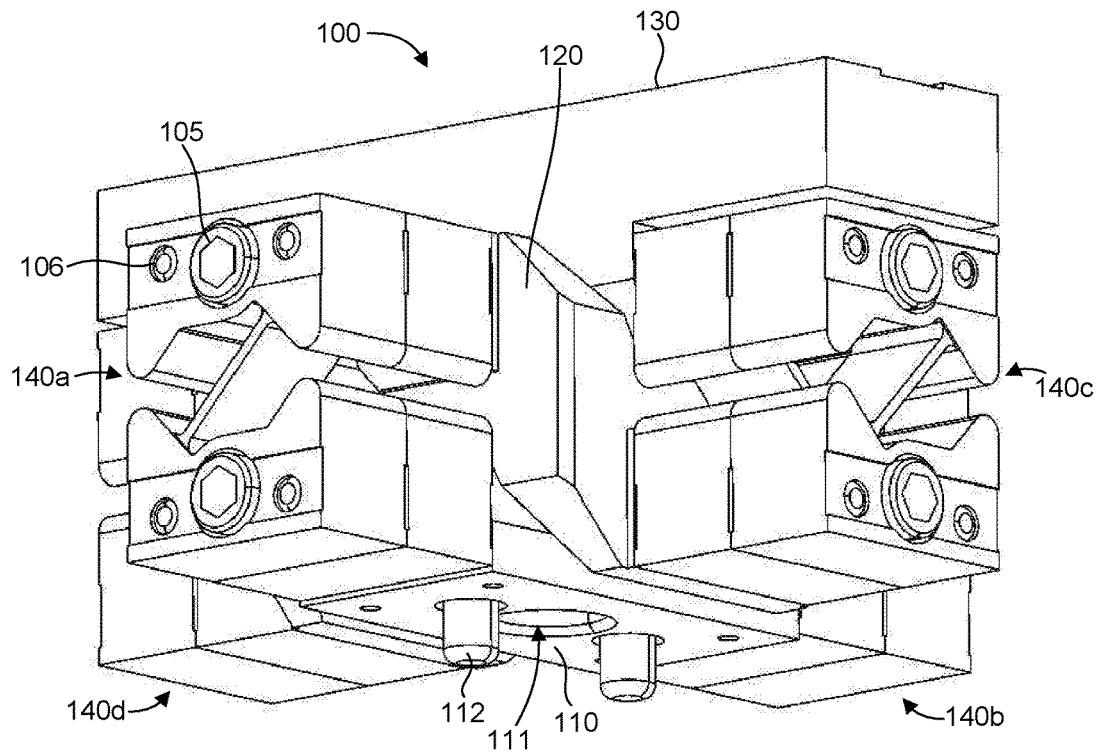
FIG. 1B is a bottom perspective view of the flexural pivot of FIG. 1A.
Figure 1C:
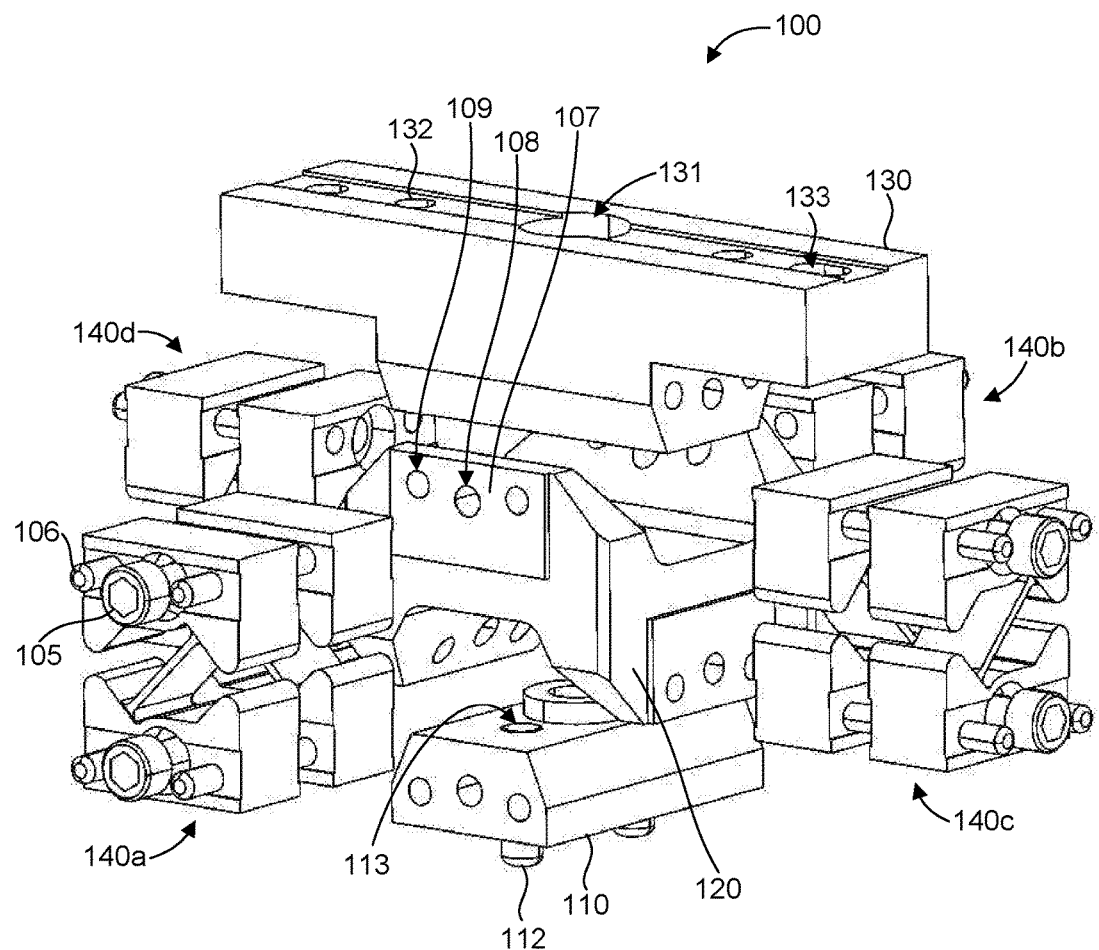
FIG. 1C is an exploded view of the flexural pivot of FIG. 1A.

One embodiment of a flexural pivot 100 is illustrated in FIGS. 1A-1C. The flexural pivot 100 can comprise a first flexure support member 110, a second flexure support member 120 rotatably coupled to the first flexure support member 110 for relative rotation about a first axis 101, and a third flexure support member 130 rotatably coupled to the second flexure support member 120 for relative rotation about a second axis 102. The axes 101, 102 can be orthogonal. The flexural pivot 100 can be coupled to external structures to facilitate relative rotation of the structures about the axes 101, 102. For example, the flexural pivot 100 can be coupled to and utilized with fast steering mirrors, which are commonly used in directed energy systems, long range laser communications systems, telescopes, or other precision optics applications, and therefore may be included in laboratory-based systems, airborne line of sight stabilization systems, satellites, etc. Thus, one external structure can be a mounting structure of a satellite, and the other external structure can be a mirror. The external structures can be coupled to the first and third flexure support members 110, 130 utilizing coupling interfaces such as openings or holes 111, 131, 132 (which may be threaded), a slot 133, a pin 112 (disposed in a hole 113), a stud, and other coupling interfaces.

The flexural pivot 100 can include cross blade flexures 140a-d rotatably coupling the flexure support members 110, 120, 130 to one another. For example, the cross blade flexures 140a-b can rotatably couple the first and second flexure support members 110, 120 to one another, and the cross blade flexures 140c-d can rotatably couple the second and third flexure support members 120, 130 to one another. Thus, the first and second flexure support members 110, 120 can move relative to one another about the first axis 101, and the second and third flexure support members 120, 130 can move relative to one another about the second axis 102, which can provide relative rotation of the first and third flexure support members 110, 130 about two axes or in two degrees of freedom. Two or more cross blade flexures can be utilized for a given axis to provide stability for the flexure support members. In this example, the second flexure support member 120 moves in only a single degree of freedom with respect to each of the first and third flexure support members 110, 130. The second flexure support member 120 may be referred to as a coupler due to its intermediate relationship with respect to the first and third flexure support members 110, 130, as well as its function coupling the two-axis rotational movement of the flexural pivot 100.

Each cross blade flexure 140a-d can have two or more flexible blade units 141 that have flexible blades 142 arranged in a cross configuration. A flexible blade unit 141 is shown isolated in FIG. 2. The flexible blade units 141 can have blade supports 143a, 143b disposed at opposite ends of the flexible blades 142 to facilitate coupling the flexible blade units 141 to the flexure support members 110, 120, 130. The flexible blades 142 can extend perpendicularly from planar surfaces 144a, 144b of the respective blade supports 143a, 143b. The flexible blades 142 can have any suitable dimension, as the principles disclosed herein provide flexible blade units that are scalable to accommodate a wide range of sizes and applications. In one example, the flexible blades can have a length of 0.38 inches, a width of 0.15 inches, and a thickness of 0.033 inches.

Figure 3:
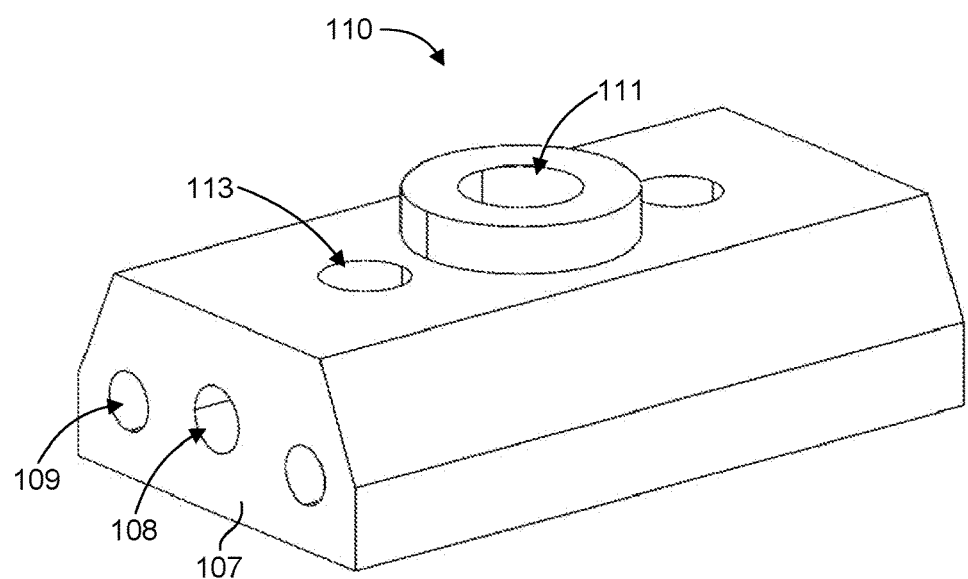
FIG. 3 illustrates a first flexure support member of the flexural pivot of FIGS. 1A-1C.
Figure 4:
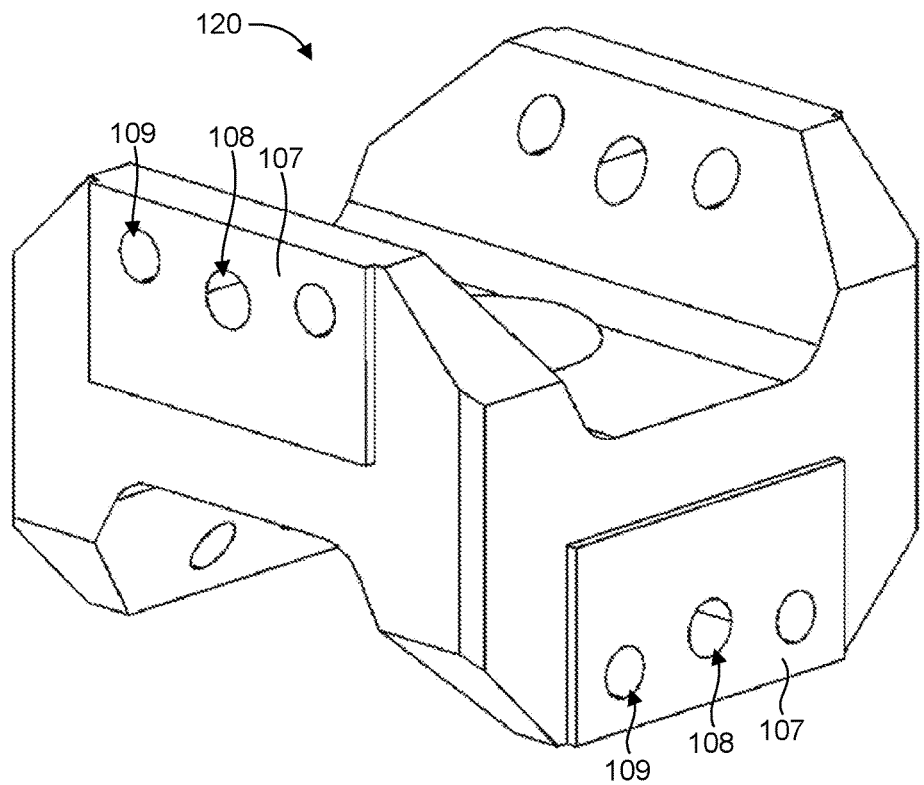
FIG. 4 illustrates a second flexure support member of the flexural pivot of FIGS. 1A-1C.
Figure 5:
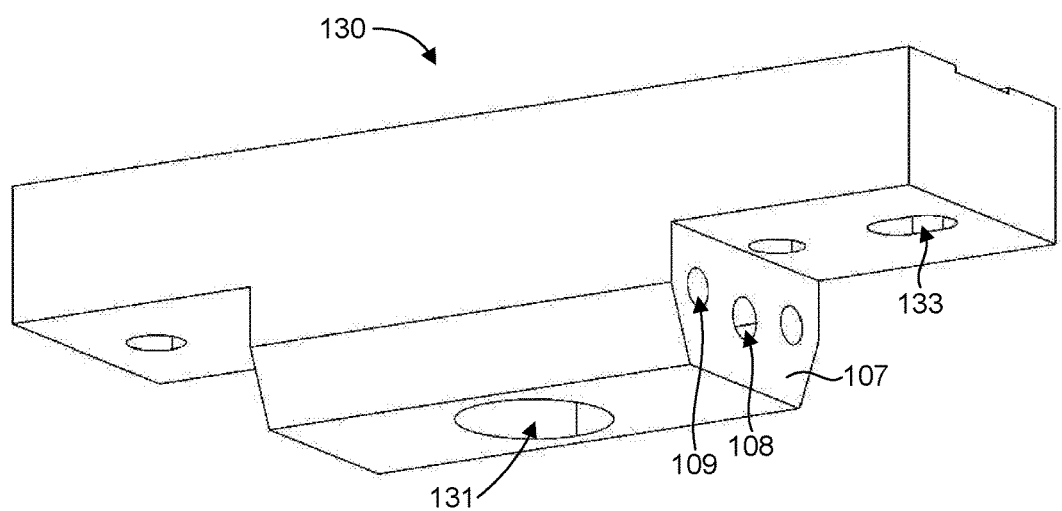
FIG. 5 illustrates a third flexure support member of the flexural pivot of FIGS. 1A-1C.

The flexible blade units 141 can be coupled to the flexure support members 110, 120, 130, such as with fasteners (e.g., bolts, screws, pins, etc). Accordingly, the blade supports 143a, 143b can have openings 145, 146 to receive the fasteners. The openings or holes 145, 146 can be counter- sunk, as desired, to accommodate a fastener head. The blade supports 143a, 143b can have interface surfaces 147 (on one or both sides) and the flexure support members 110, 120, 130 can have interface surfaces 107 (shown in FIG. 1C) that are planar. For clarity, coupling features of the flexure support members 110, 120, 130, such as interface surfaces and holes, are identified on the second flexure support member 120 in FIGS. 1A-1C. These features are also shown in FIGS. 3-5 and identified with the same reference numbers associated with each individually illustrated flexure support member.

In one example, the flexible blade units 141 can be assembled or coupled to the flexure support members 110, 120, 130 with screws or bolts 105 extending through the openings or holes 145 in the flexible blade units 141 into openings or holes 108 in the flexure support members 110, 120, 130, which may be threaded. The openings or holes 146 in the flexible blade units 141 can be match drilled with holes 109 in the flexure support members 110, 120, 130. The pins 106 can then be inserted into the openings or holes 146, 109, which may have an interference fit with the openings or holes 146, 109. Match drilling and pin insertion can ensure that the assembled components will not slip or move relative to one another during use or vibration testing. In one aspect, the blade supports 143a, 143b can be welded to the flexure support members 110, 120, 130 and/or to adjacent blade supports of another flexible blade unit 141 to eliminate any slippage between adjacent components. For example, the blade supports 143a, 143b and/or the flexure support members 110, 120, 130 can be welded at a seam between adjacent components (e.g., at a side seam).

In one aspect, the flexible blades 142 of the flexible blade units 141 can be prevented from contacting adjacent components (e.g., another flexible blade unit 141 and/or a flexure support member 110, 120, 130 to which the flexible blade unit 141 is coupled) to facilitate smooth, unrestricted movement of the flexible blades 142 during operation. For example, the flexible blades 142 can be recessed relative to the interface surfaces 147 of the blade supports 143a, 143b to prevent the flexible blades 142 from contacting adjacent components. In other words, an outer surface 148 of the flexible blade 142 may not be coplanar or flush with the interface surfaces 147 of the blade supports 143a, 143b, and may be contained within an outer space envelope of the flexible blade unit 141 defined at least in part by the interface surfaces 147.

In one aspect, the flexible blade units 141 can include travel stops 149a, 149b associated with each blade support 143a, 143b to mechanically limit a rotatable range of motion of the flexible blades 142. The opposing travel stops 149a, 149b of the blade supports 143a, 143b can be configured to contact one another at the rotational travel limits. The travel stops 149a, 149b can limit the range of motion to any suitable degree. Typically, the travel stops 149a, 149b will be configured to prevent excessive bending of the flexible blades 142 that may result in failure (e.g., yielding) of the blades. The travel stops 149a, 149b can have rounded contact tips 150a, 150b to provide more of a point-to-point contact between opposing travel stops. The travel stops 149a, 149b can be defined at least partially by the planar surfaces 144a, 144b and outer side surfaces 151a, 151b of the respective blade supports 143a, 143b, with the rounded contact tips 150a, 150b transitioning between them.

Figure 2:
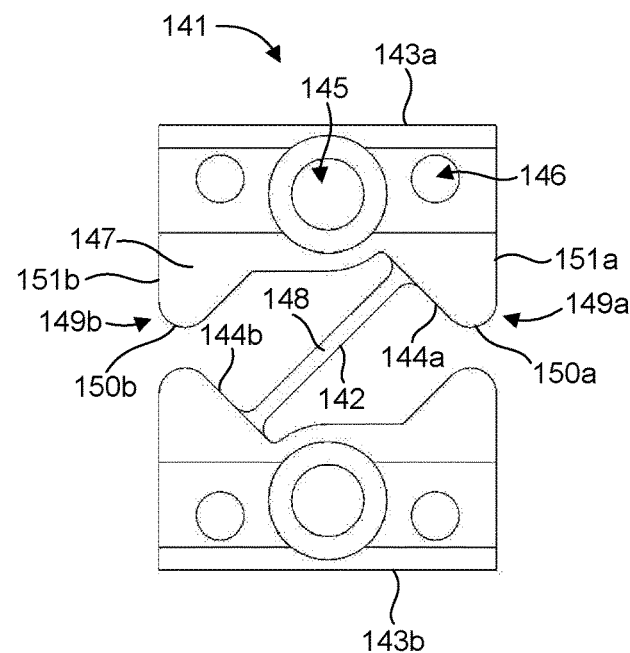
FIG. 2 illustrates a flexible blade unit of the flexural pivot of FIGS. 1A-1C.

The flexible blade units 141 can have any suitable outer shape or general profile, such as rectangular, circular, elliptical, etc. The general outer shape or profile of the flexible blade unit 141 shown in FIG. 2 is rectangular. The general outer shape or profile of a given flexible blade unit may be governed by the shape or design of the flexure support members 110, 120, 130, space constraints, etc.

The flexible blade units 141 of the cross blade flexures 140*a-d* can be substantially identical, particularly with regard to perimeter shape (shown in FIG. 2), with the only differences being manufacturing deviations, such as minor variations in fastening features (e.g., the holes 145, 146, counterbores, or other such openings), which may be due to match drilling variations. In one aspect, the flexible blade units 141 can be monolithic or one-piece structures. For example, the flexible blade 142 and the blade supports 143*a*, 143*b* of each flexible blade unit 141 can form a monolithic or one-piece structure created from a single workpiece or item of material.

In one aspect, the principles disclosed herein can provide a flexure design that is repeatable and relatively simple to manufacture. For example, multiple identical, monolithic flexible blade unit structures can be made simultaneously by forming a profile of the flexible blade unit 141 in a workpiece, which includes a profile of the flexible blade 142 and the blade supports 143*a*, 143*b* disposed at opposite ends of the flexible blade 142 and, optionally, the travel stops 149*a*, 149*b*. The profile of the flexible blade unit 141 can extend along a length of the workpiece. The length of the workpiece can be selected to at least equal a thickness of a final flexible blade unit 141 multiplied by the number of flexible blade units 141 to be obtained from the workpiece. In one aspect, all flexible blade units 141 for a given pivot flexure can be formed from the same workpiece and setup to ensure uniformity among the flexible blade units, which can provide predictable performance of the pivot flexure. In the case of the pivot flexure 100 of FIGS. 1A-1C, all eight of the flexible blade units 141 can be formed from the same workpiece, thus ensuring all eight flexible blade units have the same profile and dimensional characteristics, varying only slightly due to the particular manufacturing technique utilized to form the profile in the workpiece.

The profile can be formed in the workpiece in any suitable manner utilizing any suitable process or combination of processes. For example, the profile may be formed in the workpiece by machining, extruding, casting, forging, etc. Example machining processes include electrical discharge machining (EDM), water jet cutting, milling, broaching, etc. A manufacturing process may be selected based on the design objectives, tolerance requirements, cost, etc. A wire EDM process may provide precise machining that can meet tight tolerances and accurately control the flexure surfaces, which may be highly stressed during operation. The flexible blade units 141 can be made of any suitable material, such as titanium or steel.

Once the profile of the flexible blade units 141 has been formed in the workpiece, the workpiece can represent a stack of flexible blade units yet to be separated from one another into multiple individual flexible blade units. Accordingly, the workpiece can be divided into portions along the length to form multiple flexible blade units 141 from the workpiece that each have the same profile of flexible blades and blade supports in a monolithic structure. The workpiece can be divided into multiple flexible blade units 141 by any suitable process or technique, such as cutting, sawing, etc. A wire EDM process may be utilized to provide accurate control of the surfaces resulting from the dividing process, such as the interface surfaces 147. Final surfaces may be achieved by grinding, honing, polishing, etc, to a desired geometric and/or dimensional tolerance, and/or surface finish.

With the flexible blade units 141 separated from one another, the flexible blades 142 can optionally be recessed relative to the interface surfaces 147 of the blade supports 143*a*, 143*b*. Any suitable process can be utilized to recess the blades 142, such as grinding. In addition, one or more of the openings or holes 145, 146 to receive fasteners can be formed in the blade supports 143*a*, 143*b* at this stage. The openings or holes 145, 146 can be formed by any suitable process, such as drilling. Optionally, one or more of the openings or holes 145, 146 can be formed prior to dividing the workpiece into multiple flexible blade units.

When the flexible blade units 141 are completed sufficiently to begin assembly with the flexure support members 110, 120, 130, two or more of the flexible blade units 141 can be arranged, such that the flexible blades 142 are arranged in a cross configuration to form the cross blade flexures 140*a-d*. For example, the flexible blade units 141 can be stacked back to back to achieve the cross blade configuration. Typically, two of the flexible blade units 141 will be paired at a given location on the pivot flexure 100 to form the cross blade flexures 140*a-d*. The flexure support members 110, 120, 130 can be manufactured utilizing any suitable process or technique, such as those described above with respect to the flexible blade units 141 (e.g., milling, EDM, water jet machining, casting, forging, extruding, drilling, etc.).

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A flexural pivot, comprising:
   a first flexure support member;
   a second flexure support member rotatably coupled to the first flexure support member for relative rotation about a first axis;
   a third flexure support member rotatably coupled to the second flexure support member for relative rotation about a second axis; and
   a plurality of cross blade flexures rotatably coupling the flexure support members to one another, each cross blade flexure comprising first and second flexible blade units that have flexible blades arranged in a cross configuration, the flexible blade units comprising blade supports disposed at opposite ends of the flexible blades to facilitate coupling the flexible blade units to the flexure support members, wherein the flexible blade and the blade supports of each flexible blade unit form a monolithic structure, and wherein the flexible blades extend perpendicularly from respective planar surfaces of the respective blade supports.

2. The flexural pivot of claim 1, wherein at least one of the flexible blade units further comprises travel stops associated with the blade supports to mechanically limit a rotatable range of motion.

3. The flexural pivot of claim 1, wherein the flexible blade units are coupled to the flexure support members with fasteners, and the blade supports comprise openings to receive the fasteners.

4. The flexural pivot of claim 1, wherein the blade supports are welded to the flexure support members.

5. The flexural pivot of claim 1, wherein adjacent blade supports of the first and second flexible blade units are welded to one another.

6. The flexural pivot of claim 1, wherein the first and second flexible blade units of at least one of the cross blade flexures are substantially identical.

7. The flexural pivot of claim 1, wherein interface surfaces of the blade supports and the flexure support members are planar.

8. The flexural pivot of claim 1, wherein the flexible blades are recessed relative to interface surfaces of the blade supports to prevent the flexible blades from contacting adjacent components.

9. The flexural pivot of claim 1, wherein the flexible blade units are made of titanium or steel.

10. A flexural pivot system, comprising:
a flexural pivot including
a first flexure support member,
a second flexure support member rotatably coupled to the first flexure support member for relative rotation about a first axis,
a third flexure support member rotatably coupled to the second flexure support member for relative rotation about a second axis, and
a plurality of cross blade flexures rotatably coupling the flexure support members to one another, each cross blade flexure comprising first and second flexible blade units that have flexible blades arranged in a cross configuration, the flexible blade units comprising blade supports disposed at opposite ends of the flexible blades to facilitate coupling the flexible blade units to the flexure support members, wherein the flexible blade and the blade supports of each flexible blade unit form a monolithic structure, and wherein the flexible blades extend perpendicularly from respective planar surfaces of the respective blade supports;
a first structure coupled to the first flexure support member; and
a second structure coupled to the third flexure support member to facilitate relative rotation of the first and second structures about the first and second axes.

11. The system of claim 10, wherein at least one of the flexible blade units further comprises travel stops associated with the blade supports to mechanically limit a rotatable range of motion.

12. The system of claim 10, wherein the first and second flexible blade units of at least one of the cross blade flexures are substantially identical.

13. A method for making a cross blade flexure, comprising:
obtaining a workpiece having a length;
forming a profile in the workpiece of a flexible blade and blade supports disposed at opposite ends of the flexible blade such that the profile extends along the length;
dividing the workpiece into portions along the length to form a plurality of flexible blade units, each having the same profile of flexible blades and blade supports in a monolithic structure; and
pairing two of the flexible blade units such that the flexible blades are arranged in a cross configuration to form a cross blade flexure.

14. The method of claim 13, wherein forming a profile in the workpiece comprises machining the workpiece.

15. The method of claim 14, wherein machining the workpiece comprises electrical discharge machining (EDM).

16. The method of claim 13, further comprising forming a profile in the workpiece of travel stops associated with the blade supports.

17. The method of claim 13, further comprising recessing the flexible blades relative to interface surfaces of the blade supports.

18. The method of claim 13, wherein the flexible blades extend perpendicularly from planar surfaces of the blade supports.

19. The method of claim 13, further comprising forming openings in the blade supports to receive fasteners.

20. A flexural pivot, comprising:
a first flexure support member;
a second flexure support member rotatably coupled to the first flexure support member for relative rotation about a first axis;
a third flexure support member rotatably coupled to the second flexure support member for relative rotation about a second axis; and
a plurality of cross blade flexures rotatably coupling the flexure support members to one another, each cross blade flexure comprising first and second flexible blade units that have flexible blades arranged in a cross configuration, the flexible blade units comprising blade supports disposed at opposite ends of the flexible blades to facilitate coupling the flexible blade units to the flexure support members, wherein the flexible blade and the blade supports of each flexible blade unit form a monolithic structure, and wherein the flexible blades are recessed relative to interface surfaces of the blade supports to prevent the flexible blades from contacting adjacent components.

21. A flexural pivot system, comprising:
a flexural pivot including
a first flexure support member,
a second flexure support member rotatably coupled to the first flexure support member for relative rotation about a first axis,
a third flexure support member rotatably coupled to the second flexure support member for relative rotation about a second axis, and
a plurality of cross blade flexures rotatably coupling the flexure support members to one another, each cross blade flexure comprising first and second flexible blade units that have flexible blades arranged in a cross configuration, the flexible blade units comprising blade supports disposed at opposite ends of the flexible blades to facilitate coupling the flexible blade units to the flexure support members, wherein the flexible blade and the blade supports of each flexible blade unit form a monolithic structure, and wherein the flexible blades are recessed relative to interface surfaces of the blade supports to prevent the flexible blades from contacting adjacent components;

a first structure coupled to the first flexure support member; and a second structure coupled to the third flexure support member to facilitate relative rotation of the first and second structures about the first and second axes.

* * * * *